United States Patent [19]
Tsai et al.

[11] Patent Number: 6,084,691
[45] Date of Patent: Jul. 4, 2000

[54] MULTI-PURPOSE SCANNER INTEGRATED INTO A COMPUTER

[75] Inventors: Meng Ta Tsai; Don Kai Chiang; Cader Ching-Te Shih, all of Hsinchu, Taiwan

[73] Assignee: Microtek International, Inc., Hsinchu, Taiwan

[21] Appl. No.: 08/850,252

[22] Filed: May 2, 1997

Related U.S. Application Data

[63] Continuation-in-part of application No. 08/833,921, Apr. 10, 1997, abandoned.

[51] Int. Cl.[7] .............................. H04N 1/04; H04N 1/024; H05K 5/00
[52] U.S. Cl. ......................... 358/474; 358/473; 358/496; 361/683; 361/686
[58] Field of Search .................................. 358/400, 473, 358/471, 474, 496, 497, 498, 442, 403, 468; 361/683, 686; 382/313, 314; H04N 1/04, 1/024; H05K 5/00

[56] References Cited

U.S. PATENT DOCUMENTS

| | | | |
|---|---|---|---|
| 5,191,406 | 3/1993 | Brandestini et al. | 348/111 |
| 5,499,108 | 3/1996 | Cotte et al. | 358/400 |
| 5,663,812 | 9/1997 | Pan | 358/474 |
| 5,663,813 | 9/1997 | Pan | 358/474 |
| 5,742,407 | 4/1998 | Albrecht et al. | 358/474 |
| 5,778,272 | 7/1998 | Wenthe et al. | 358/474 |
| 5,790,278 | 8/1998 | Ehrne et al. | 358/474 |
| 5,818,611 | 10/1998 | Shih | 358/474 |
| 5,841,553 | 11/1998 | Neukermans | 358/474 |
| 5,850,296 | 12/1998 | Wang et al. | 358/474 |

FOREIGN PATENT DOCUMENTS

| | | |
|---|---|---|
| 183523 | 5/1992 | China. |
| 231765 | 10/1994 | China. |
| 282196 | 9/1995 | China. |
| 288619 | 10/1996 | China. |

*Primary Examiner*—Cheukfan Lee
*Attorney, Agent, or Firm*—McCutchen, Doyle, Brown & Enersen, LLP

[57] ABSTRACT

A multi-purpose scanner that can be integrated into a computer. In one embodiment, the multi-purpose scanner functions as a desktop scanner. It includes a scanning engine and an external housing. The external housing substantially encapsulates the scanning engine to reduce electromagnetic interference to the scanning engine. In another embodiment, the multi-purpose scanner scans with scanning engine mechanically attached to the computer. The scanning engine includes an internal body, a chassis and a positioning assembly. The chassis holds the internal body, and the assembly moves the internal body relative to the chassis. In this embodiment, the scanner extends a part of the internal body out of the chassis in order to scan a medium. In a third embodiment, the multi-purpose scanner functions as a handheld scanner. The scanning engine includes a front-panel unit that is releasably attached to an engine unit. The third embodiment includes the engine unit and a back-housing compartment substantially encapsulating the engine unit to reduce electromagnetic interference coupled to the engine unit.

19 Claims, 12 Drawing Sheets

MULTI-PURPOSE SCANNER INTEGRATED INTO A COMPUTER

This is a continuation-in-part of U.S. patent application Ser. No. 08/833,921, entitled "Multi-Purpose Image Scanning Device", filed on Apr. 10, 1997 now abandoned, which is incorporated by reference into this specification.

BACKGROUND

The present invention relates generally to a scanner and, more particularly, to a multi-purpose scanner that can be integrated into a computer.

With the significant increase in the use of different types of scanners, we need a multi-purpose scanner that takes up minimal amount of space.

For years, the most important computer peripheral device has been a printer. Almost everyone with a computer also uses a printer. This may be because most people are more comfortable reading from paper than from a computer screen. Thus, the proliferation of computers, instead of moving us to a paperless society, has created even more paper than before. With so much paper to deal with, many of us have experienced the problems of losing documents or forgetting where we filed them.

One way to solve these problems is to scan at least the important documents into our computer. Then we can perform computer searches, which are much faster and easier than looking everywhere in our office or our home. Such increased uses of scanners may explain why scanners appear to be second to printers in terms of sales volume for computer peripheral devices.

Not only do we need a scanner, we typically need different types of scanners for different applications. When we are working in an office, a stand-alone desktop scanner satisfies most of our needs. If we are traveling, we prefer a portable or, even better, a handheld scanner. Thus, we should have access to at least a desktop and a handheld scanner. However scanners are typically designed for functional and not artistic reasons. It is difficult to organize a number of such scanners in an office without disrupting the decor of the office.

Thus, we need a multi-purpose scanner that occupies minimal amount of space.

SUMMARY

The present invention is on a multi-purpose scanner that does not have to occupy any space outside a computer, because a user can integrate it into the computer. The invention can scan while attached to the computer, and can be docked in the computer just like a diskdrive. Moreover, it can work as a stand-alone desktop scanner or as a handheld scanner.

In one embodiment, the multi-purpose scanner includes a scanning engine and an external housing. The engine can integrate into a computer, and is substantially the same size as a disk drive, such as a 5.25 inches disk drive or a Compact-Disk-Read-Only-Memory drive.

The multi-purpose scanner can function as a desk-top scanner while mechanically detached from the computer. The external housing can substantially encapsulate the scanning engine to at least reduce electromagnetic interference to the scanning engine.

The multi-purpose scanner can function as a scanner with the scanning engine mechanically attached to the computer. In one embodiment, the scanning engine includes an internal body, a chassis and a locationing assembly. The chassis holds the internal body and can fit into a disk-drive slot of the computer. The assembly, coupled to both the body and the chassis, allows the internal body to move relative to the chassis. The scanner can rely on the locationing assembly to extend a part of the internal body out of the computer for scanning a medium.

In another embodiment, the multi-purpose scanner can function as a handheld scanner. It includes a part of the scanning engine and a part of the external housing. The scanning engine includes a front-panel unit releasably attached to an engine unit. The external housing includes a front-housing compartment and a back-housing compartment. The front-housing compartment can substantially encapsulate the front-panel unit, while the back-housing compartment can substantially encapsulate the engine unit. To function as a handheld scanner, a user removes the scanning engine from the computer. Then the front-panel unit with the front-housing compartment are detached from the engine unit with the back-housing compartment. The back-housing compartment substantially encapsulates the engine unit for at least reducing electromagnetic interference to the scanning engine.

Other aspects and advantages of the present invention will become apparent from the following detailed description which, when taken in conjunction with the accompanying drawings, illustrates by way of example the principles of the invention.

DETAILED DESCRIPTION

Figure 1:
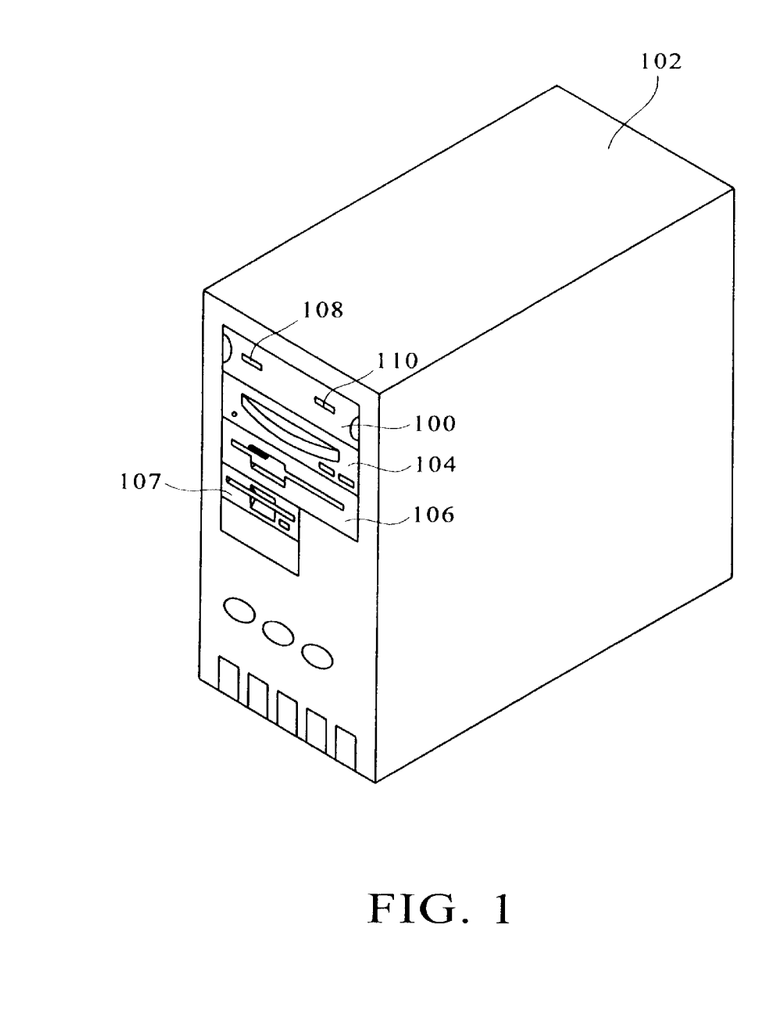
FIG. 1 shows one embodiment of the present invention integrated into a computer.

FIG. 1 shows one embodiment of a scanning engine 100 integrated into a computer 102 in the present invention. The computer 102 also includes a Compact-Disk-Read-Only-Memory ("CD-ROM") drive 104, a 5.25 inches disk drive 106 and a 3.5 inches disk drive 107. The scanning engine 100 can function as a scanner while mechanically attached to the computer 102. The invention is designed so that the scanning engine 100 can be transformed to also function as a desktop scanner, or a handheld scanner.

In one embodiment, the scanning engine 100 is substantially the same size as a 5.25 inches disk drive or a CD-ROM drive. The engine can be integrated into the computer 102, such as by fitting into a computer memory-drive slot built for those drives.

Figure 2A:
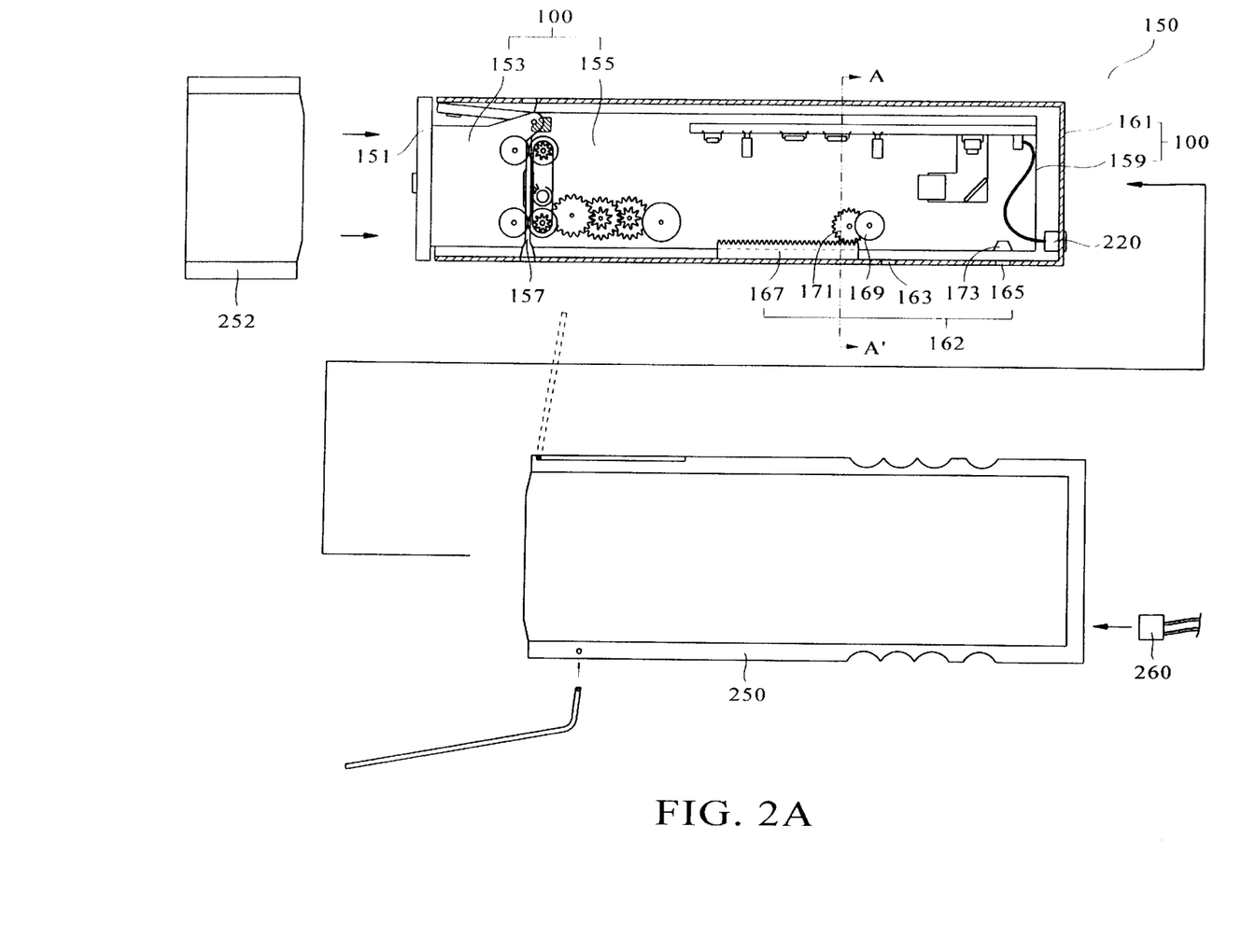
FIG. 2A–C show one embodiment of a desktop scanner of the present invention.

FIG. 2A shows one embodiment that transforms the scanning engine 100 to function as a desktop scanner 150, which can be defined as a scanner that can scan images while sitting on a flat surface. The figure includes a cross-sectional view of the scanning engine 100, which includes an internal body 159, and a chassis 161 that can fit into a memory drive slot in the computer 102. Also, from another perspective, the engine 100 includes a front-panel unit 153 releasably attached to an engine unit 155. Between the front-panel unit 153 and the engine unit 155, there is a channel 157 where, during scanning, the medium to be scanned passes through. To simplify the description of the present invention, the medium to be scanned is paper. However, other media are also applicable, including business cards and photographs.

The internal body 159 can move relative to the chassis 161 based on a locationing assembly 162 coupling to both. As shown in FIG. 2A, in the chassis 161, there are a first hole 163, a second hole 165 and a gear bar 167 attached to chassis 161; in the internal body 159, there is a position sensing device 173, and a first stepping motor 169 controlling a gear wheel 171. The axle of the gear wheel 171 is attached to the internal body 159, and the teeth of the gear wheel 171 mate with the teeth on the gear bar 167.

Figure 2B:
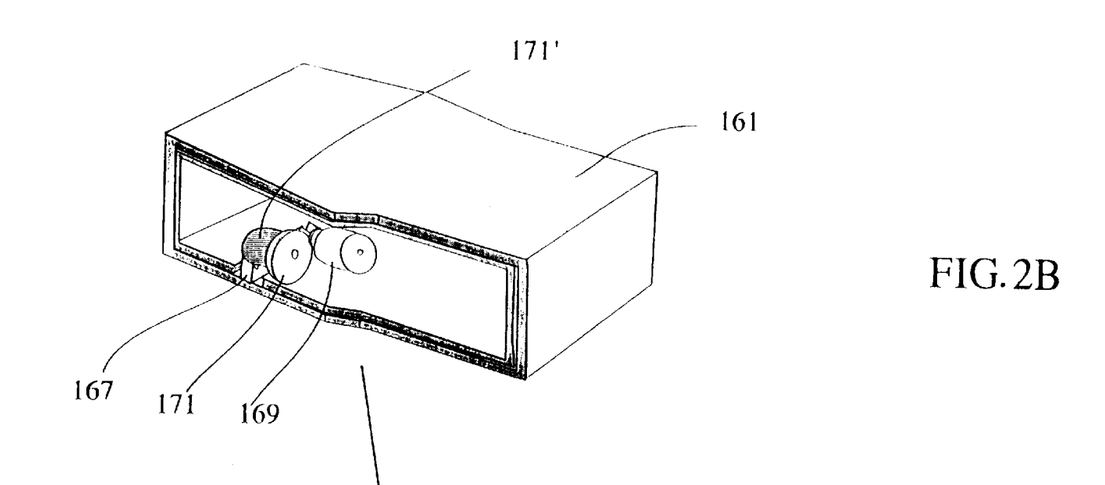
Figure 2C:
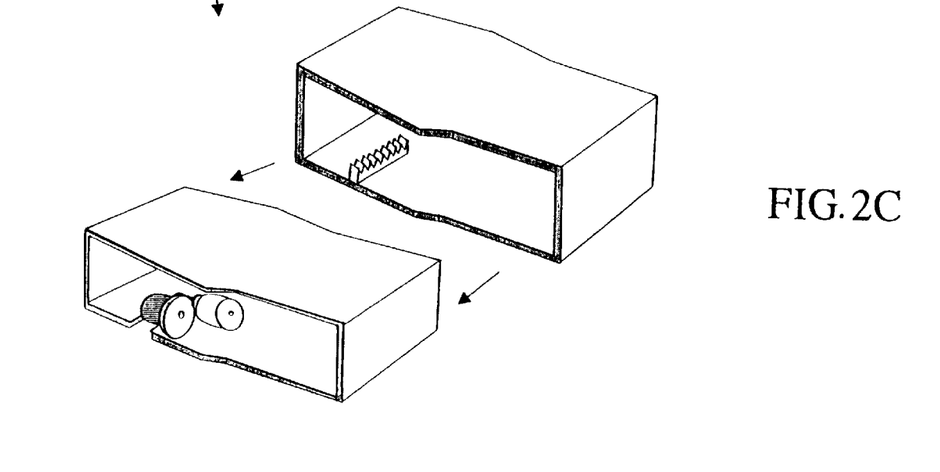

When the gear wheel turns, the internal body 159 moves relative to the chassis 161. FIGS. 2B–C show two positions of a different perspective of the internal body 159 relative to the chassis 161 at the position AA' of FIG. 2A. The two figures also show on the other side of the gear wheel 171, there is a cylindrical section 171' (See FIGS. 2B and 2C), whose teeth mate with the teeth on the gear bar. As the motor 169 turns the gear wheel 171, the teeth of the cylindrical section 171' of the gear wheel 171 push against the gear bar 167. In turn, the internal body 159 moves relative to the chassis 161.

The position sensing device 173 sets the position of the internal body 159 relative to the chassis 161. One position is with the sensor 173 over the second hole 165, and the other position is with the sensor over the first hole 163. In the former position, the internal body 159 is substantially retracted inside the chassis 161. In the latter position, the internal body 159 is extended out of the chassis 161. In the desktop scanner mode, the internal body 159 is substantially retracted inside the chassis, with the sensor 173 over the second hole 165. The scanner control is aware of the number of pulses sent to the stepping motor 169 to move the sensor 173 from the first hole 163 to the second hole 163. By sending different number of pulses, the scanner control can set the internal body 159 to other positions relative to the chassis 161.

In addition to the scanning engine 100, the desktop scanner 150 also includes an external housing, which includes a front-housing compartment 252 and a back-housing compartment 250. The external housing substantially encapsulates the scanning engine 100, except, for example as shown in FIG. 2A, the front cover 151 of the front-panel unit 153 is exposed. Through encapsulation, the front-panel unit 153 fits into the front-housing compartment 252, and the engine unit 155 fits into the back-housing compartment 250. The external housing serves a number of purposes; for example, it reduces electromagnetic interference to the scanning engine when the scanning engine is detached from the computer to scan; and it can be artistically designed to improve the scanner's appearance. In one embodiment, the housing is made of plastic with a metallic coating on its inside surface. Also, the front cover of the front-panel unit is either metallic or is covered by a metallic covering.

Figure 3:
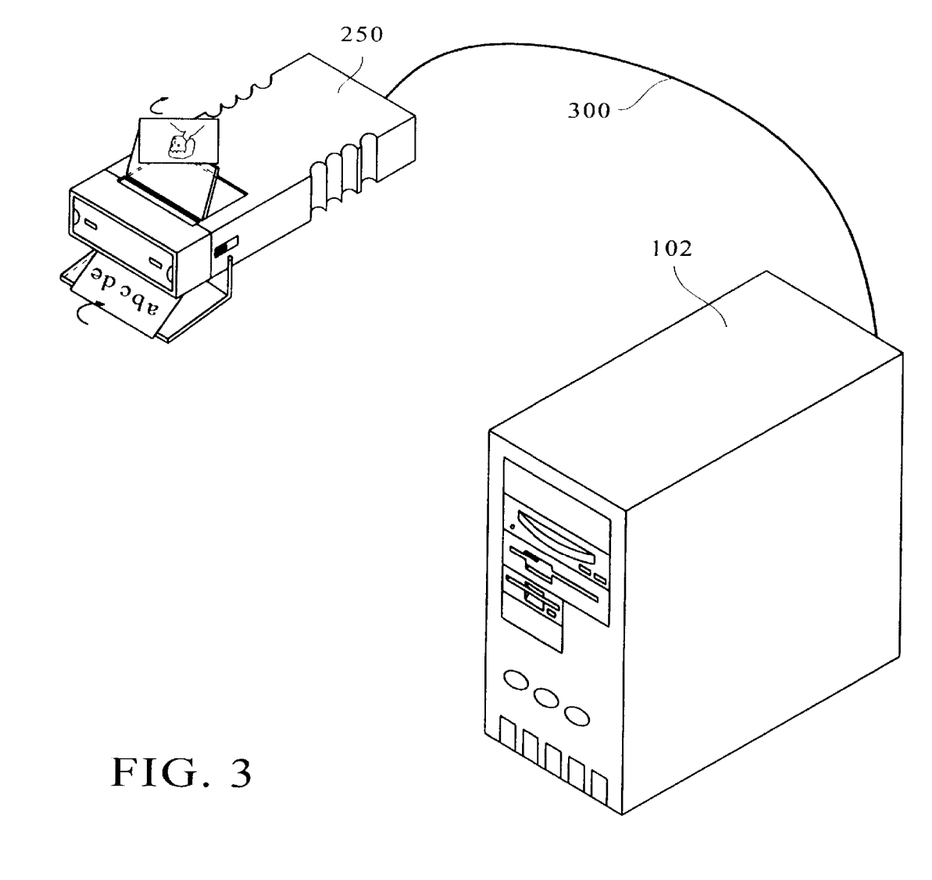
FIG. 3 shows one embodiment of a desktop scanner in the present invention electrically coupled to the computer.

An engine connector 220 on the chassis 161 couples to an external connector 260 to transfer data from the scanning engine 100 to an external device. FIG. 3 shows the external device connected to the desktop scanner 150 being the computer 102. The scanner 150 in FIG. 3 is slightly different from the scanner shown in FIG. 2A. For example, there is an output tray 258—to be described later—connected to the front-housing compartment 252, instead of the back-housing compartment 250. The cable 300 electrically couples the external connector 260 to an input port of the computer 102. The computer input port, the engine connector 220, and the external connector 260 can be made for different configurations, such as the Integrated Device Electronics (IDE), Small Computer System Interface (SCSI), Enhanced Parallel Port (EPP) and Universal Serial Bus (USB).

Figure 4A:
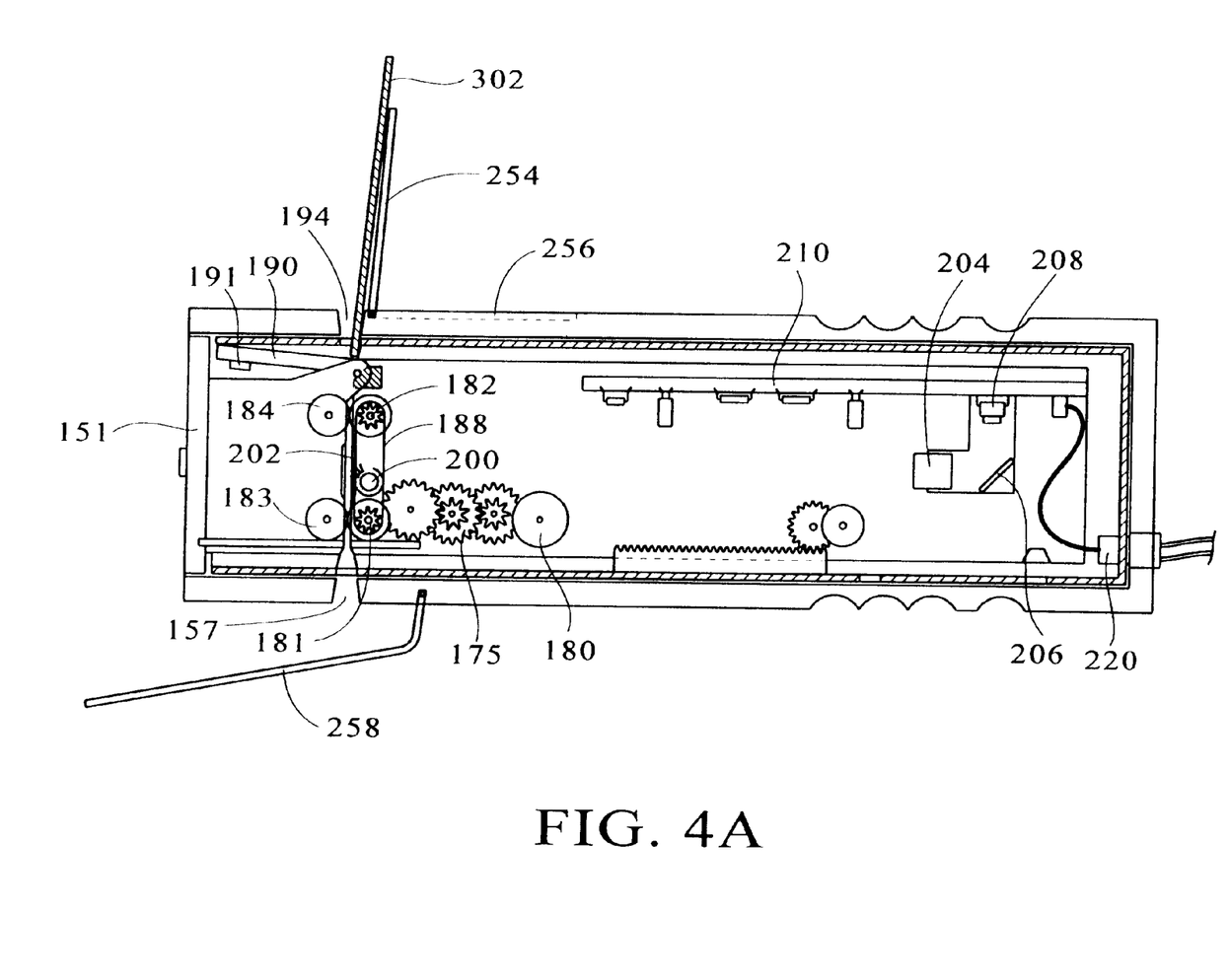
FIGS. 4A–B show one embodiment in the present invention of a desktop scanner scanning a medium.
Figure 4B:
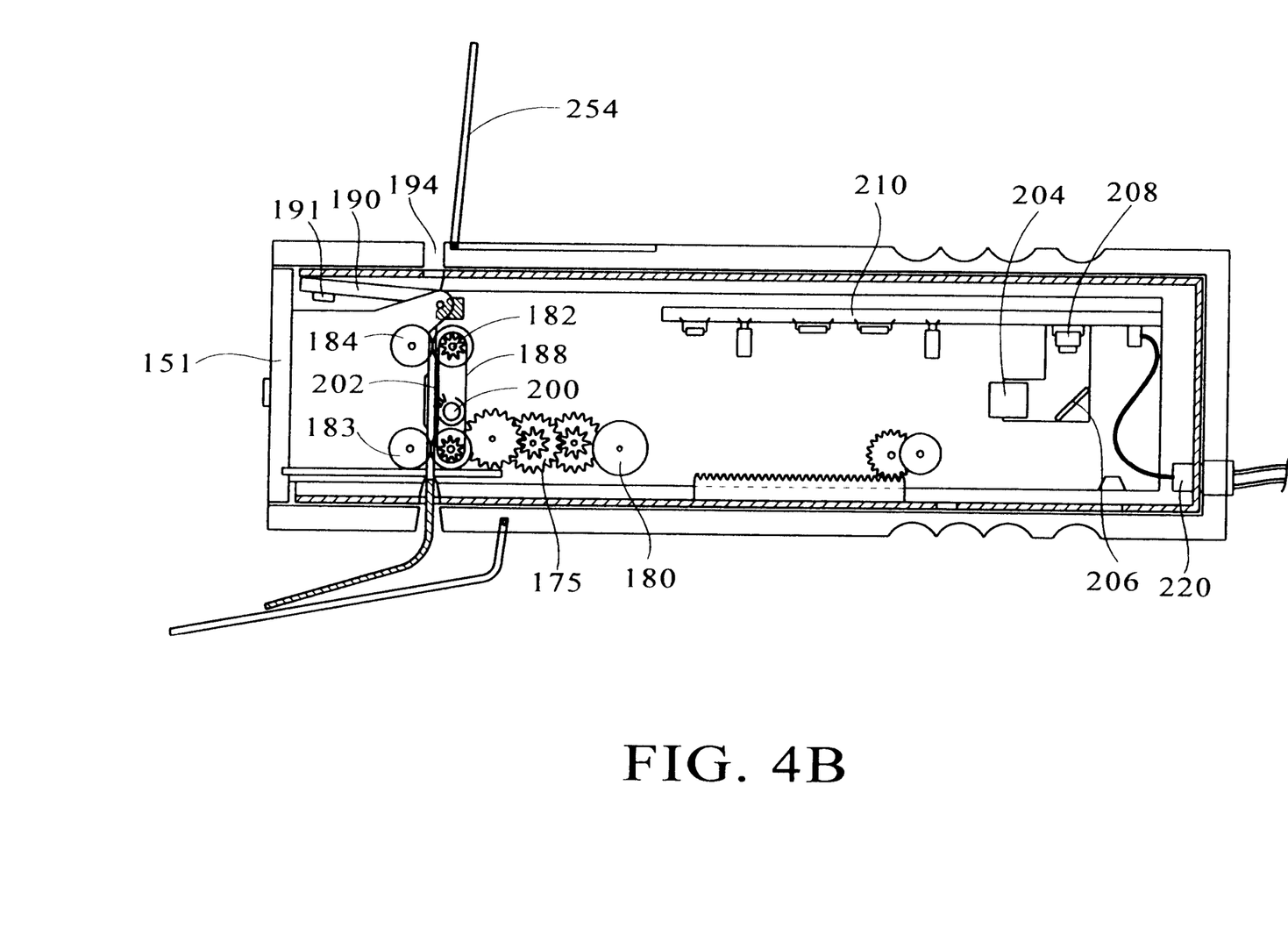

FIGS. 4A–B show the desktop scanner 150 scanning a piece of paper 302, which goes through a slot 194 into the channel 157. FIG. 4A shows the paper ready to be scanned, and FIG. 4B shows the paper being scanned.

As shown in FIG. 4A, in one embodiment, the scanning engine 100 includes a second stepping motor 180, which drives a chain of gear wheels 175, to draw paper into the channel 157. The teeth of one of the gear wheels mate with the teeth of the gear of a first driving roller 181, which is linked to a second driving roller 182 by a belt 188. When the second stepping motor 180 turns, the first and the second driving rollers turn accordingly. The two rollers, 181 and 182, when turned, draw the paper into the channel 157. To enhance a smooth entry, the scanning engine 100 also includes two additional rollers, 183 and 184, which are adjacent to the two driving rollers. The two additional rollers, 183 and 184, are passive rollers. The paper turns the passive rollers when it passes through the channel 157. The two additional rollers, 183 and 184, are in the front-panel unit 153.

The front-panel unit 153 includes an input tray 190 with two adjustable limiting tabs 191. With the external housing encapsulating the scanning engine, the input tray 190 is held within the front-housing compartment 252. The input tray 190 includes a slot 194 that allows the paper to go into the channel 157 when the front panel unit 153 is in the front-housing compartment 252.

In one embodiment, to capture the image of the paper during scanning, the scanner uses a cold cathode lamp 200 to shine light through a window 202 to the paper. The reflection from the paper, which mirrors the image on the paper, is focused by a lens 204, reflected by a mirror 206 and captured by charge-coupled devices 208. The image is then analyzed and, typically compressed by the electronics and firmware on a printed-circuit board 210. The resultant signals propagate to the engine connector 220 to be transmitted.

When the paper is scanned, it passes through the channel 157 in an orientation that is substantially parallel to the front cover 151 of the front-panel unit 153. The front cover holds an pen switch 110 and a scan switch 108, as shown in FIG. 1. In one embodiment, the back-housing compartment 250 includes an external input board 254 and the output tray 258. Part of the paper can lie on the external input board 254 during scanning. The board 254 can be reclined to fit into a slot 256 in the back-housing compartment 250. The output tray 258 can be mounted onto the bottom of the back-housing compartment 250 so that the paper, after being scanned, sits on the tray.

Figure 5:
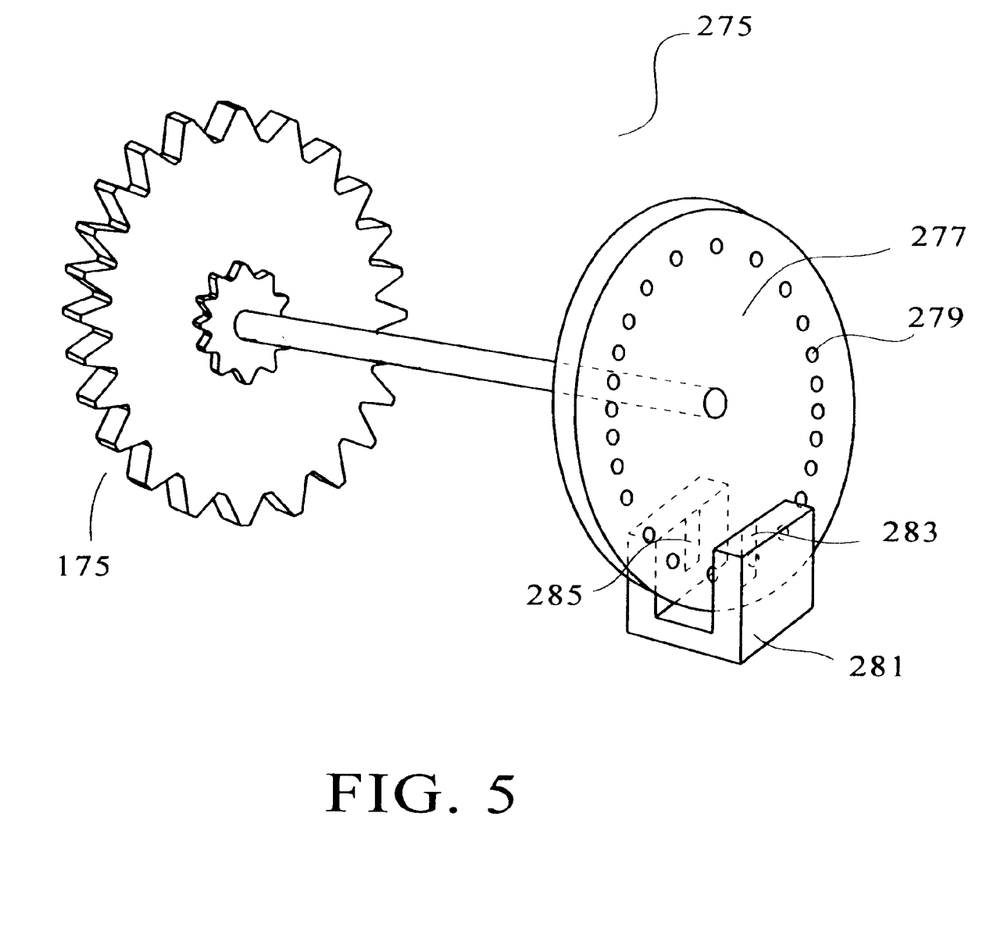
FIG. 5 shows one embodiment of an encoder in the present invention.

As the paper moves into the channel 157, the scanner correlates the paper movement with the image scanned. FIG. 5 shows one embodiment of a position encoder 275, connected to one of the gear wheels, 175. The encoder 275 tracks the image scanned to the position of the image on the paper. As the paper passes into the scanner 150, the driving rollers, 181 and 182, rotate with an encoded wheel 277, which has numerous holes or slots, such as 279 on its circumference. The positions of the slots are calibrated, and are typically evenly spaced on the circumference of the wheel. The encoder 275 also includes a U-shaped transceiver 281; one arm of the transceiver has a light source 283 and the other arm has a light detector 285. The light source and the detector are positioned so that light from the source can go through every hole on the wheel 277 as the wheel turns, and is received by the detector. As the encoded wheel 277 turns, the light detector 285 receives intermittent signals from the light source 283. With the positions of the holes calibrated, the position encoder 275 indicates how much the rollers, 181 and 182, has rotated. This, in turn, tracks the image scanned to the position of the image on the paper. Implementing such encoders should be obvious to those skilled in the art, and will not be further elaborated.

Figure 6:
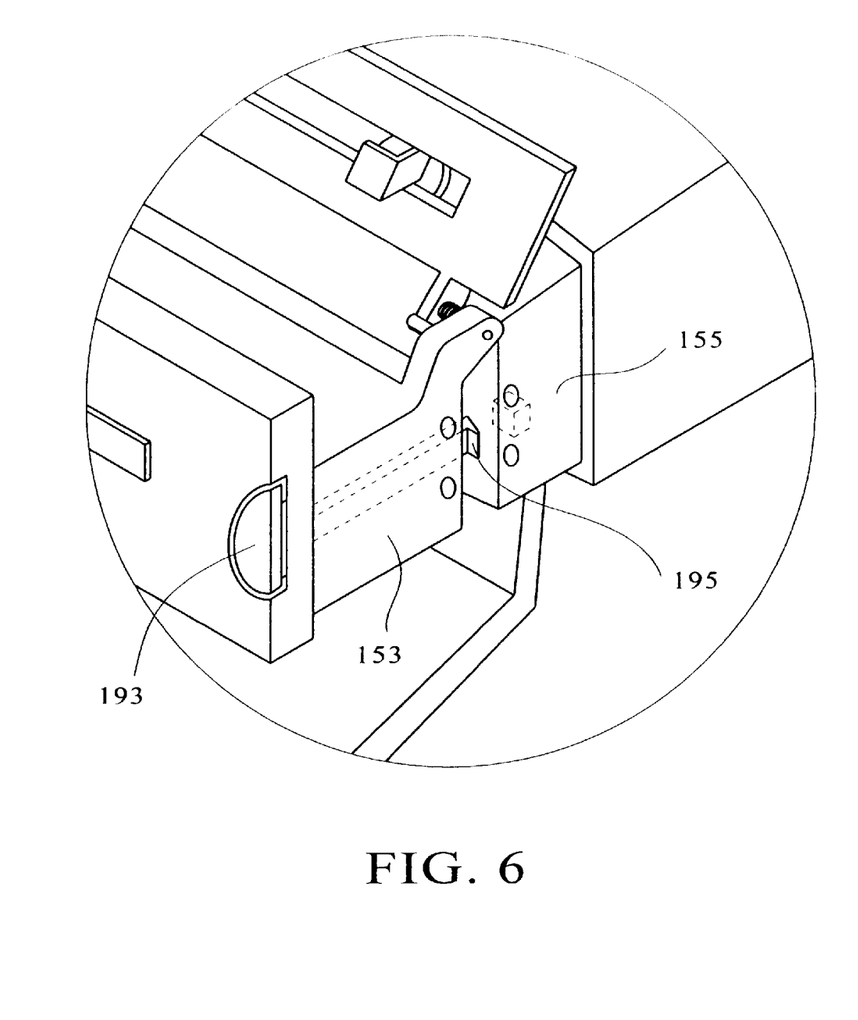
FIG. 6 shows one embodiment of a front-panel unit releasably attaches to an engine unit of a scanning engine in the present invention.

FIG. 6 shows one embodiment where the front-panel unit 153 releasably attaches to the engine unit 155 through hooking the two units together. One approach to hook is to have a push-button on each side of the front-panel unit 153, such as 193, with each button coupled to a hook that goes into a slot in the engine unit, such as the slot 195. If a user wants to release the front-panel unit 153 from the engine unit 155, he pushes the two buttons, and pulls the front-panel unit from the engine unit. Implementing such hooking mechanisms should be obvious to those skilled in the art, and will not be further elaborated.

The paper might be jammed in the channel 157 during scanning. One way to remove the jammed paper is to separate the front-panel unit 153 from the engine unit 155. In one embodiment, the front-housing compartment 252 is removed from the front-panel unit 153, and then the front-panel unit is mechanically detached from the engine unit 155. With the units detached, the channel 157 is exposed, and the jammed paper can be easily removed.

Figure 7:
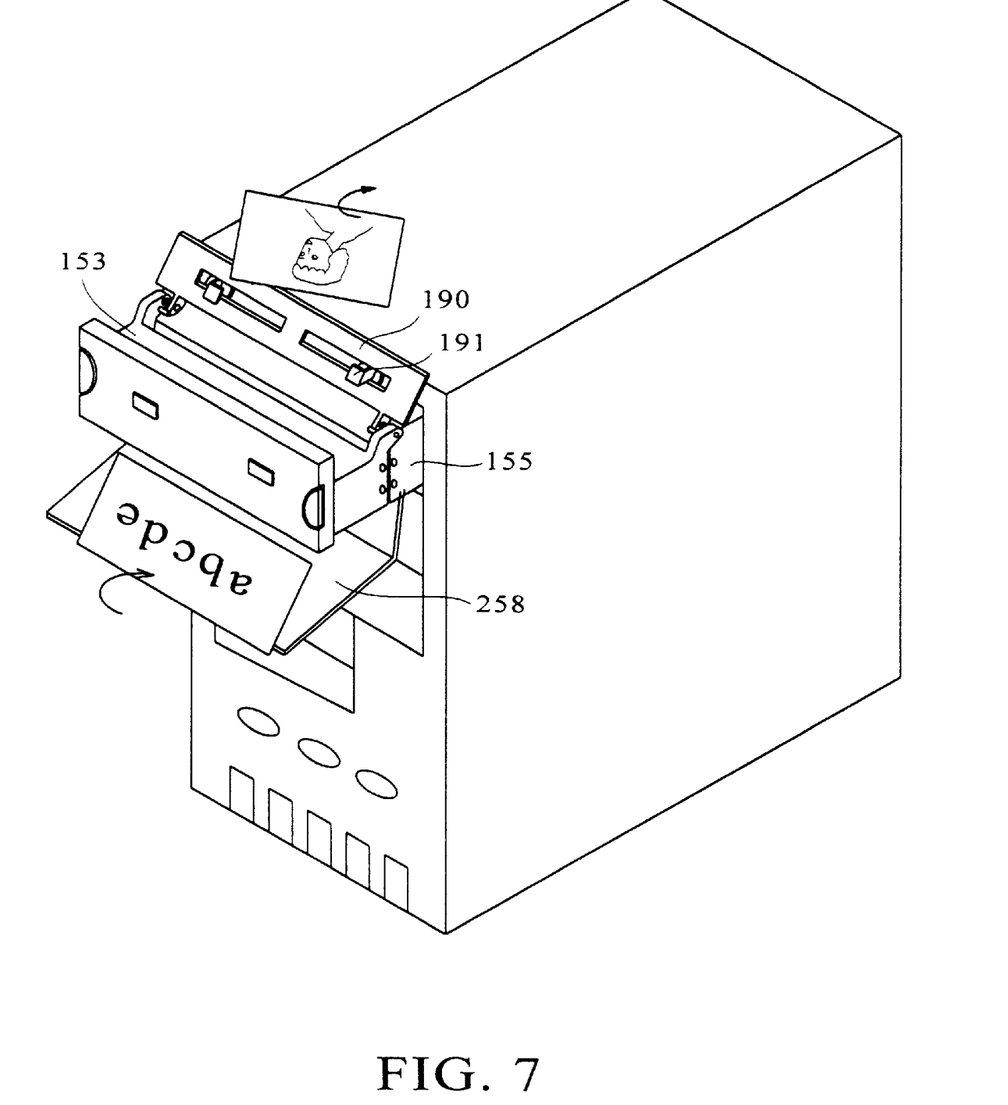
FIG. 7 shows one embodiment of the present invention scanning a medium while mechanically attached to the computer.

The scanning engine 100 can be integrated into the computer 102 and still functions as a scanner. FIG. 1 shows the engine 100 in the computer, with the internal body 159 retracted inside the chassis 161. Here, substantially only the front cover 151 of the front-panel unit is exposed. To scan, a part of the internal body 159 is extended out of the chassis 161, with the chassis 161 still mechanically attached to the computer. In one embodiment, the user can push the switch 110, which activates the stepper motor 169 and turns the wheel gear 171 to extend a part of the internal body 159 out of the chassis 161. The internal body 159 extends until the position sensor 173 senses the hole 163. FIG. 7 shows one such extended position. The input tray 190 also flips open by spring action. The two adjustable tabs 191 can guide the paper by setting the distance between the tabs to be slightly wider than the width of the paper. In the figure, the paper has been flipped 180 degrees to show the image to be scanned. The two tabs 191 guide the paper into the channel 157. After the paper 302 is positioned on the input tray 190, pushing the scan button 102 activates scanning. The output tray 258 can be mounted onto the engine unit 155 to catch the paper after it is scanned.

Figure 8:
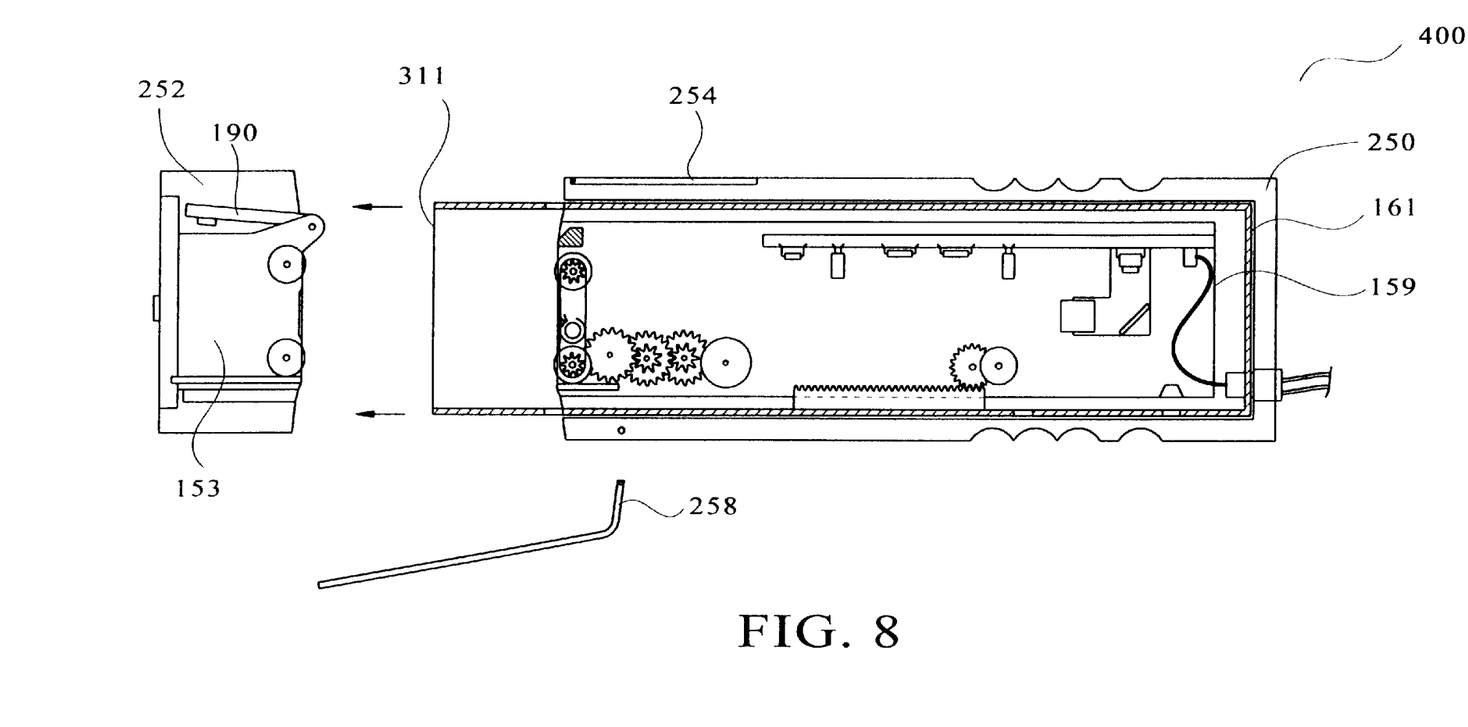
FIG. 8 shows one embodiment of a handheld scanner transformed from a desk top scanner of the present invention.

FIG. 8 shows one embodiment that modifies the desktop scanner 150 into a handheld scanner 400. First, the user detaches the front-panel unit 153 and the front-housing compartment 252 from the desktop scanner 150. Then, the user folds the board 254 back into the slot 256 in the back-housing compartment 250, and detaches the output tray 258 from the back-housing compartment 250.

As shown in FIG. 8, in one embodiment, a part of the chassis 161 extends beyond the engine unit 155. One reason for the extension is to hold the input tray 190 down when the front-panel unit 153 is attached to the desktop scanner 150.

When the user wants to use the handheld scanner to scan, in one embodiment, he enters a command into the computer, such as into a dialog-box shown on the computer display. Then, the computer activates the stepper motor 169 to extend the internal body 159 outwards. The extension ensures at least apart of the driving rollers, 181 and 182, and a sensor 402 to be slightly beyond the edge 311 of the chassis 161. The scanner controls the amount of extension by sending the appropriate number of pulses to the stepper motor 169. In one embodiment, even if the front-panel unit 153 is attached to the engine unit 155, after the user enters the command into the computer, the internal body 159 can still extend outwards, because there is space in the front-panel unit.

Figure 9:
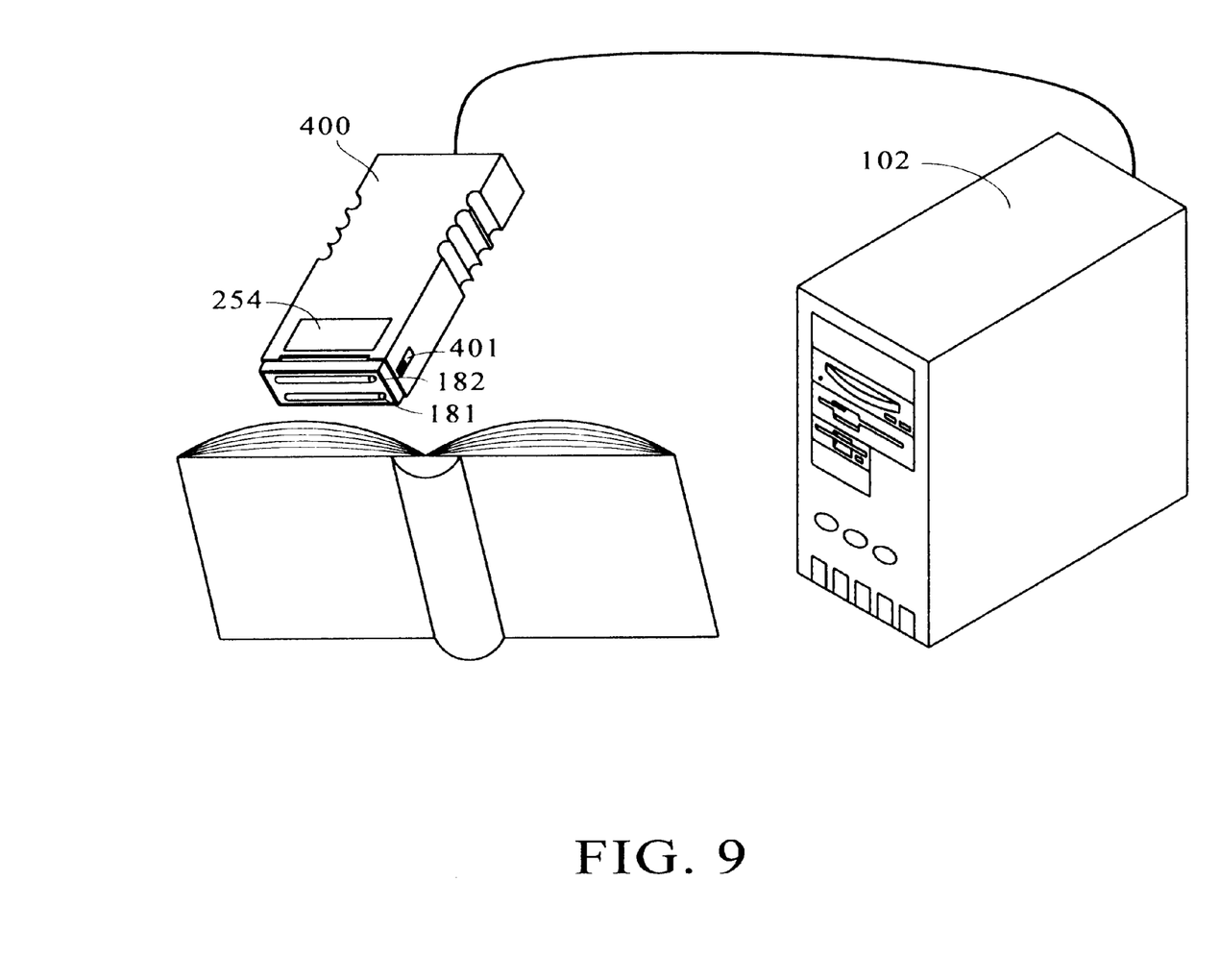
FIG. 9 shows the handheld scanner in FIG. 8 electrically coupled to the computer.

The handheld scanner 400 includes the engine unit 155 in the back-housing compartment 250. FIG. 9 shows the handheld scanner 400 electrically coupled to the computer 102, ready to scan a book. The figure also shows the two driving rollers, 181 and 182, which can hold the scanner 400 upright on a flat surface.

Figure 10:
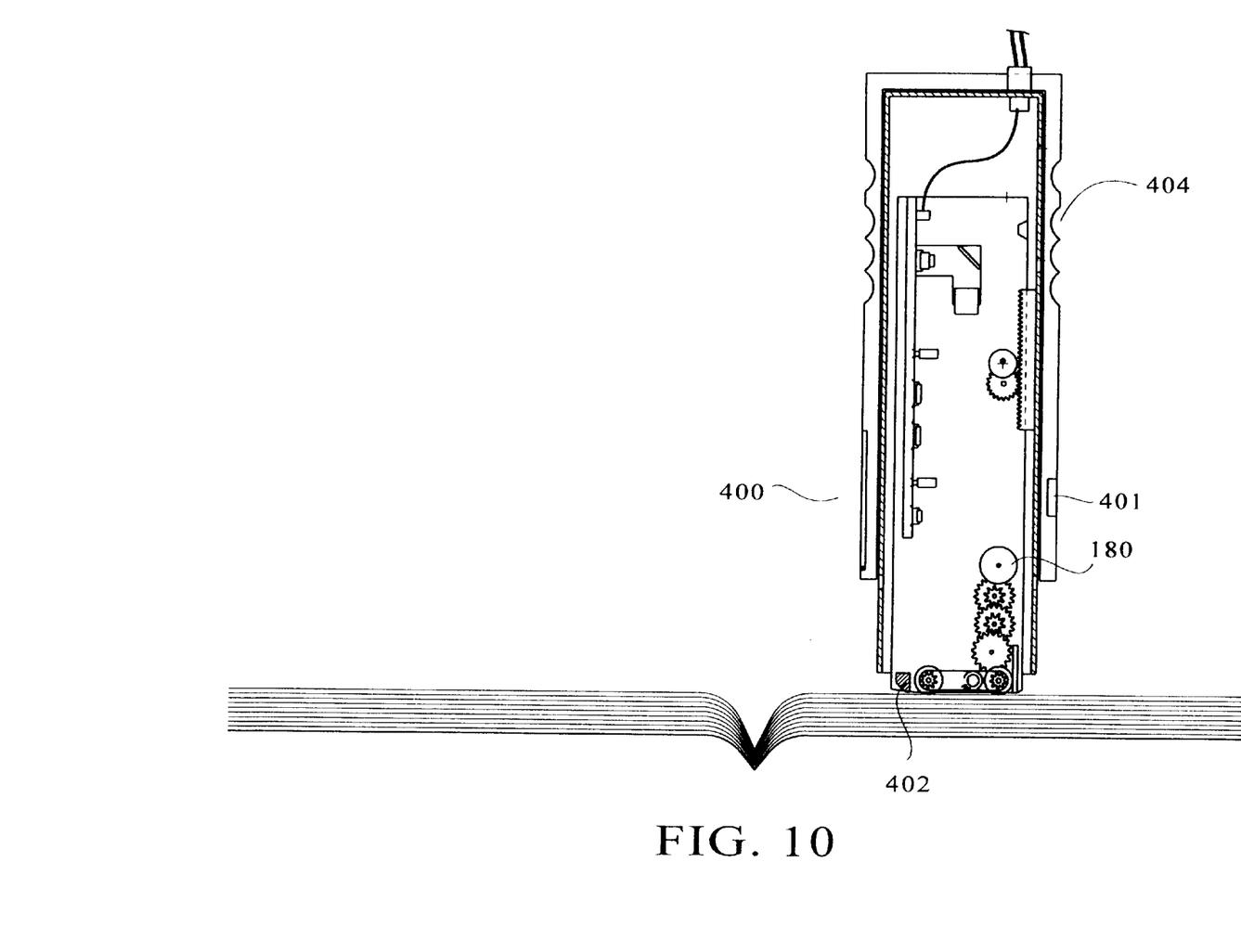
FIG. 10 shows the handheld scanner in FIG. 8 scanning a book.

FIG. 10 shows the handheld scanner 400 scanning the book. The handheld scanner 400 includes two modes of operation, a manual-driven mode and an automatic mode, as set by a switch 401.

In the automatic mode, when the sensor 402 detects that a medium is to be scanned, an input requester asks the user whether he wants to scan, This requester can be through a dialog box on the computer screen. An affirmative answer activates the stepper motor 180, which starts the driving rollers, 181 and 182. The scanner 400 then moves automatically over the book while scanning it. In one embodiment, the sensor is a pressure-sensitive device with a spring; when it is compressed, the spring presses onto the device, which produces an interrupt signal to activate asking the user if he wants to scan.

When the switch is at the manual-driven mode, the stepper motor 180 does not control the two driving rollers, 181 and 182, and the sensor 402 is deactivated. The user can hold onto the scanner 400 at indented areas, 404, and move the scanner 400 across the book. In one embodiment, as the rollers, 181 and 182, rotate, the encoder wheel 275 turns. A turning wheel activates the scanner 400 to capture scanned images. Thus, the encoder wheel 275 not only indicates the relative position of the scanned image on the paper, the wheel's movement also starts the scanning process; when the wheel stops turning, the scanner stops scanning.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A multi-purpose scanning apparatus, adapted for operation while integrated into a computer and further adapted for operation as a desktop scanner when removed from the computer, said multi-purpose scanning apparatus comprising:

a scanning engine
configured for integration into a computer, and
further configured for operation as a scanner when integrated into the computer and mechanically attached to the computer; and
an external housing for substantially encapsulating the scanning engine so as to reduce electromagnetic interference to the scanning engine, wherein, when the scanning engine is mechanically separated from the computer and substantially encapsulated with the external housing, the scanning engine substantially encapsulated with the external housing is configured for operation as a desk-top scanner.

2. A scanning apparatus as recited in claim 1 wherein:
the external housing includes a front-housing compartment and a back-housing compartment; and
the scanning engine includes a front-panel unit releasably attached to an engine unit;
such that the front-panel unit fits into the front-housing compartment, and the engine unit fits into the back-housing compartment.

3. A scanning apparatus as recited in claim 2 wherein:
when the scanning engine integrates into the computer, substantially only the front cover of a front-panel unit is exposed; and
between the front-panel unit and the engine unit, there is a channel where during scanning, the medium passes through in an orientation that is substantially parallel to the front cover.

4. A scanning apparatus as recited in claim 3 wherein:
the scanning engine includes
an internal body;
a chassis holding the internal body;
a positioning assembly coupled to both the body and the chassis for moving the internal body relative to the chassis;
such that the positioning assembly extends at least a part of the internal body out of the chassis to scan a medium, while the scanning engine is mechanically attached to the computer.

5. A scanning apparatus as recited in claim 4 further comprising an input tray mechanically coupled to the scanning engine, the tray having a set of adjustable limiting tabs for guiding the medium into the channel to be scanned.

6. A scanning apparatus as recited in claim 1 wherein the scanning engine is of substantially the same size as a 5.25 inches disk drive.

7. A scanning apparatus as recited in claim 1 wherein the scanning engine is of substantially the same size as a Compact-Disk-Read-Only-Memory drive.

8. A scanning apparatus comprising:
a scanning engine
configured for integration into a computer, and
further configured for operation as a scanner while mechanically attached to the computer; and
an external housing for substantially encapsulating the scanning engine so as to reduce electromagnetic interference to the scanning engine when the scanning engine is detached mechanically from the computer to be used as a desk-top scanner, wherein the external housing includes a front-housing compartment and a back-housing compartment, and
wherein the scanning engine includes a front-panel unit releasably attached to an engine unit such that the front-panel unit fits into the front-housing compartment and the engine unit fits into the back-housing compartment, and when the scanning engine integrates into the computer substantially only the front cover of the front-panel is exposed, and
wherein between the front-panel unit and the engine unit, there is a channel where during scanning, the medium passes through in an orientation that is substantially parallel to the front cover of the front-panel unit, and
wherein if the medium is jammed in the channel, first releasing the front-panel unit with the front-housing compartment from the engine unit with the back-housing compartment allows removal of the medium.

9. A multi-purpose scanning apparatus adapted for operation while integrated into a computer and further adapted for operation as a handheld scanner when removed from the computer, said multi-purpose scanning apparatus comprising:
a scanning engine
configured for integration into the computer,
further configured for operation as a scanner when integrated into the computer and mechanically attached to the computer, and
includes a front-panel unit releasably attached to an engine unit; and
a back-housing compartment configured for substantially encapsulating the engine unit;
wherein the apparatus is configured for operation as a handheld scanner when
the scanning engine is mechanically detached from the computer;
the front-panel unit is removed from the engine unit; and
the back-housing compartment substantially encapsulates the engine unit to reduce electromagnetic interference to the scanning engine.

10. A scanning apparatus as recited in claim 9 further includes a switch to set the handheld scanner to be either manual driven or automatic.

11. A scanning apparatus as recited in claim 9 wherein:
the engine unit includes a sensor for sensing the presence of a medium to be scanned, and a set of rollers;
the apparatus further comprises an input requester requesting an input from a user to activate scanning when the sensor senses the presence of the medium; and
when scanning is activated, the set of rollers automatically rotates to move the apparatus over the medium for scanning the medium.

12. A multi-purpose scanning apparatus adapted for operation while integrated into a computer and further adapted for operation as a handheld scanner when removed from the computer, said multi-purpose scanning apparatus comprising:
a scanning engine
configured for integration into the computer; and
includes a front-panel unit releasably attached to an engine unit; and
an external housing
for substantially encapsulating the scanning engine so as to reduce electromagnetic interference to the scanning engine when the scanning engine is mechanically detached from the computer; and
including a front-housing compartment and a back-housing compartment such that the front-panel unit fits into the front-housing compartment, and the engine unit fits into the back-housing compartment;

such that
   the scanning engine substantially encapsulated in the external housing is configured for operation as a desk-top scanner; and
   the engine unit fitting into the back-housing compartment is configured for operation as a handheld scanner.

13. A scanning apparatus as recited in claim 12 wherein the scanning engine is of substantially the same size as a 5.25 inches disk drive.

14. A scanning apparatus as recited in claim 12 wherein the scanning engine is of substantially the same size as a Compact-Disk-Read-Only-Memory drive.

15. A scanning apparatus as recited in claim 12 wherein:
   when the scanning engine integrates into the computer, substantially only the front cover of the front-panel unit is exposed; and
   for the desk-top scanner, between the front-panel unit and the engine unit, there is a channel where during scanning, the medium passes through in an orientation that is substantially parallel to the front cover of the front-panel unit.

16. A scanning apparatus as recited in claim 15 wherein if the medium is jammed in the channel, first releasing front-panel unit with the front-housing compartment from the engine unit with the back-housing compartment allows removal of the medium.

17. A scanning apparatus as recited in claim 12 wherein:
   the scanning engine includes
      an internal body;
      a chassis holding the internal body;
      a positioning assembly coupled to both the body and the chassis for moving the internal body relative to the chassis;
      such that the positioning assembly extends at least a part of the internal body out of the chassis to scan a medium, while the scanning engine is mechanically attached to the computer.

18. A scanning apparatus as recited in claim 12 further includes a switch to set the handheld scanner to be either manual driven or automatic.

19. A scanning apparatus as recited in claim. 18 wherein for the handheld scanner:
   the engine unit includes a sensor for sensing the presence of a medium to be scanned, and a set of rollers;
   the handheld scanner further comprises an input requester requesting an input from a user to activate scanning when the sensor senses the presence of the medium; and
   when scanning is activated, the set of rollers automatically rotates to move the handheld scanner over the medium for scanning the medium.

* * * * *